UNITED STATES PATENT OFFICE.

ROBERT DEISSLER, OF TREPTOW, NEAR BERLIN, GERMANY, ASSIGNOR TO CLARENCE B. SCHULTZ, OF BERLIN, GERMANY.

PROCESS OF HEATING METAL PARTS.

SPECIFICATION forming part of Reissued Letters Patent No. 12,003, dated June 24, 1902.

Original No. 623,239, dated April 18, 1899. Application for reissue filed October 5, 1900. Serial No. 32,202.

*To all whom it may concern:*

Be it known that I, ROBERT DEISSLER, a subject of the King of Prussia, German Emperor, and a resident of Treptow, near Berlin, in the Kingdom of Prussia, German Empire, have invented a new and useful Process of Heating Metal Parts, of which the following is an exact specification.

This invention relates to a process of heating metal pieces which are to be welded or soldered or repaired or shaped in any way, the source of heating being a chemical reaction in which a combustion of a metal is brought about by means of solid compounds containing oxygen or sulfids or halogenids being used. The substances by the oxidation of which the temperature desired is produced should of course be such that have a high temperature of combustion, and among these substances I have found aluminum and magnesium to be the most suitable ones. According to the degree of temperature desired or necessary for this kind of work the above-named substances may be used singly or mixed with each other, and in either case I may employ the substance or substances in connection with carbon or with any suitable material containing carbon. All the substances used are reduced to small pieces before being used.

If an oxid and aluminum are put into reaction, the latter proceeds according to the formulæ given in the following examples:

Example I: $Fe_2O_3+Al_2=Al_2O_3+Fe_2$.

Example II: $2Al_2+3BaO_2=2Al_2O_3+3Ba$.

The reaction is analogous if the oxid is replaced by a sulfid, a halogenid, or a salt of an acid containing oxygen. A mixture of such kind would react about as follows:

Example III:

$$CaSO_4+5Mg=MgS+4MgO+Ca.$$

The typical point in all these and similar reactions resides in the reaction propagating itself automatically. In other words, if the mixture is ignited at a certain point or place or if the reaction is initiated at a certain point or place of the mixture then the reaction proceeds automatically from that point or place to the neighboring parts, from these again to the neighboring parts, and so on until the reaction has been transmitted to and through the whole quantity of the mixture or mass. The time of reaction may thus be lengthened at will by adding fresh quantities to those being already in reaction, and I prefer to employ for this purpose the mixture or mass in the shapes of cubes, prisms, or similar bodies. The degree of temperature resulting from the reaction depends on the kind of components of the mass, and by suitably selecting the components the degree of temperature may be determined at will or according to any requirement.

If a piece of iron—say a rivet or the like—is to be heated, that piece is embedded in the reaction mass, and the latter is ignited at any point or place, for instance, by a blowpipe-flame. After the reaction has propagated to and through the whole mass this latter (which has then turned into a slag) is removed by means of a hammer or other suitable tool, when the rivet will be found white-hot and ready for being worked. A time of forty seconds only is necessary for thus heating a rivet having a weight of about two hundred and fifty grams.

If two pieces of metal are to be connected by soldering, the respective two parts or ends are first brought in contact with each other and the solder is then applied in the known way. To prevent the solder from flowing away after being melted, it is preferably surrounded by a small dam or ring of some fireproof material. The two pieces after thus being prepared are embedded in the reaction mass or the latter is cast over said two parts or ends and the mass is then ignited. When the reaction has been finished and the slag removed, it will be found that the said parts or ends have become soldered in a most perfect manner. In this way flanges, for instance, may be fixed to tubes or pipes or pipes may be secured to the walls of a boiler or the like, and in very much the same way faulty places of a piece or part of welded, rolled, or cast iron or other metal may be repaired. This is effected by letting flow upon or into the faulty place a molten metal or alloy of a kind or composition equal to that of the respective piece or part.

Some of the metal or alloy of which the device or tool to be repaired is made may be added to the heat-producing mixture, or a reaction mass may be employed, from which the desired metal or alloy is separated in the course of the reaction.

Suppose a cleft in a sheet of iron shall be closed. Then a small dam of some fireproof material is cast around the cleft, and the cavity thus formed is filled up with a mixture of aluminum and oxid of iron. The mixture is then ignited, when by chemical action between aluminum and oxid of iron free molten iron is produced, which fills up the cleft. At the same time the heat produced softens the edges of the cleft sufficiently to effect a perfect union between the molten metal and the edges. If pieces or parts of steel or cast-iron are to be worked in this or similar manner, the aluminum must receive an addition of carbid of calcium, when carbureted iron will result, and if the iron resulting from the reaction is desired to contain manganese, chromium, silicium, vanadium, or the like these metals may either be admixed as such with the aluminum and the oxid of iron or compounds of the same with oxygen or sulfur may be made use of. In all these and similar cases the mixture may be such that the metal separated is free from aluminum, the latter being not used in excess.

The separated metal may, if desired, be employed for strengthening or reinforcing the repaired pieces or parts or for forming projections and the like upon the same.

My novel method may also be employed for welding purposes—*i. e.*, for heating the pieces or parts to welding temperature—and it may further be used for making a hole or holes in a plate. This is effected by forming a heap or column of the reaction mass upon the place where the hole is to be formed, igniting the mass, and punching a hole through the softened portion of the plate, or the process is continued until the metal is melted perfectly through, so that no punch or similar tool need be used.

Having thus described my invention, I claim as new and desire to secure by Letters Patent—

1. The process of heating parts of metallic objects consisting in subjecting the same to the heat resulting from the chemical reaction taking place in an ignited mass of finely-divided aluminum and an oxygen or sulfur bearing compound, substantially as described.

2. The process of heating parts of metallic objects consisting in embedding them in a mass of finely-divided metallic aluminum, and a sulfur or oxygen bearing metallic compound, igniting the mass and after the reaction has propagated itself through the whole mass removing the slag formed thereby, as specified.

In testimony whereof I have signed this specification in the presence of two subscribing witnesses.

ROBERT DEISSLER.

Witnesses:
HENRY HASPER,
WILLIAM MAYNER.